(12) United States Patent
Xu

(10) Patent No.: US 12,726,442 B2
(45) Date of Patent: Sep. 1, 2026

(54) METHOD AND APPARATUS FOR PACKET FORWARDING, AND ELECTRONIC DEVICE

(71) Applicant: New H3C Technologies Co., Ltd., Hangzhou (CN)

(72) Inventor: Jing Xu, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 45 days.

(21) Appl. No.: 19/032,684

(22) Filed: Jan. 21, 2025

(65) Prior Publication Data

US 2025/0310265 A1 Oct. 2, 2025

(30) Foreign Application Priority Data

Mar. 28, 2024 (CN) ......................... 202410374902.5

(51) Int. Cl.
*H04L 47/20* (2022.01)
*H04L 45/74* (2022.01)
(Continued)

(52) U.S. Cl.
CPC .............. *H04L 47/20* (2013.01); *H04L 45/74* (2013.01); *H04L 47/125* (2013.01); *H04L 47/24* (2013.01)

(58) Field of Classification Search
None
See application file for complete search history.

(56) References Cited

U.S. PATENT DOCUMENTS 11,418,435 B2 * 8/2022 Filsfils .................... H04L 45/74
12,250,139 B2 * 3/2025 Mittal ..................... H04L 45/02
(Continued)

FOREIGN PATENT DOCUMENTS

CN 113542123 10/2021
CN 116319538 6/2023
(Continued)

OTHER PUBLICATIONS

Extended European Search Report issued in corresponding European Application No. 25153162.0, dated Jun. 16, 2025.
Notice of Allowance issued in corresponding Chinese Application No. 202410374902.5, dated May 25, 2026 (Machine Translation provided).

*Primary Examiner* — Atta Khan
(74) *Attorney, Agent, or Firm* — NORTON ROSE FULBRIGHT US LLP

(57) ABSTRACT

Disclosed are a method and apparatus for packet forwarding and an electronic device, which relate to the field of communication technology. The method includes: receiving a service packet having a destination address and a flow characteristic; obtaining a target service attribute matching the flow characteristic, and obtaining at least one intelligent policy routing (IPR) template matching the destination address; selecting a target IPR template matching the target service attribute from the at least one IPR template, and obtaining a target quality condition of the target IPR template; selecting a SRv6 TE policy meeting the target quality condition from the target IPR template, wherein the SRv6 TE policy includes a first candidate path; forwarding the service packet through the first candidate path; wherein each IPR template comprises multiple SRv6 TE policies with a same service attribute and a quality condition corresponding to the service attribute, the multiple SRv6 TE policies have different link priorities, and the selected SRv6 TE policy has a highest link priority.

20 Claims, 3 Drawing Sheets

(51) Int. Cl.
*H04L 47/125* (2022.01)
*H04L 47/24* (2022.01)

(56) References Cited

U.S. PATENT DOCUMENTS

2018/0375764 A1* 12/2018 Filsfils .................... H04L 45/50
2020/0274778 A1 8/2020 Lecuyer et al.
2024/0244503 A1* 7/2024 Lee ......................... H04L 45/34
2025/0247327 A1* 7/2025 Nguyen .................. H04L 45/76

FOREIGN PATENT DOCUMENTS

CN 116319549 6/2023
CN 118400315 7/2024

* cited by examiner

METHOD AND APPARATUS FOR PACKET FORWARDING, AND ELECTRONIC DEVICE

CROSS-REFERENCE TO RELATED APPLICATIONS

This application claims priority to Chinese Application No. 202410374902.5, filed Mar. 28, 2024, which is incorporated into the present application by reference.

TECHNICAL FIELD

The present disclosure relates to the field of communication technology, particularly to a method and apparatus for packet forwarding and an electronic device.

BACKGROUND

The Internet Protocol Version 6 Segment Routing Traffic Engineering Policy (SRv6 TE Policy) is a new tunnel-based traffic steering technology developed based on the Segment Routing IPv6 (SRv6) technology. By employing this tunnel-based traffic steering technology, a service packet can be steered into an appropriate SRv6 TE Policy, and then forwarded using a forwarding path within the SRv6 TE Policy.

SUMMARY

Examples of the present disclosure are to provide a method and apparatus for packet forwarding, and an electronic device to avoid the impact on service quality due to degradation of a path quality of a forwarding path. The specific technical solutions are as follows:

In a first aspect, an example of the present disclosure provides a method for packet forwarding, including:

- receiving a service packet having a destination address and a flow characteristic;
- obtaining a target service attribute matching the flow characteristic, and obtaining at least one Intelligent Policy Routing (IPR) template matching the destination address;
- selecting a target IPR template matching the target service attribute from the at least one IPR template, and obtaining a target quality condition of the target IPR template;
- selecting a Segment Routing IPv6 (SRv6) Traffic Engineering (TE) Policy that meets the target quality condition from the IPR template, wherein the SRv6 TE Policy includes a first candidate path;
- forwarding the service packet through the first candidate path;
- wherein each IPR template includes multiple SRv6 TE Policies with a same service attribute and a quality condition corresponding to the service attribute, wherein the multiple SRv6 TE Policies have different link priorities, and the selected SRv6 TE Policy has a highest link priority.

In a second aspect, an example of the present disclosure provides an apparatus for packet forwarding, including:

- a receiving module for receiving a service packet having a destination address and a flow characteristic;
- an obtaining module for obtaining a target service attribute matching the flow characteristic and obtaining at least one IPR template matching the destination address;
- a selecting module for selecting a target IPR template matching the target service attribute from the at least one IPR template, and obtaining a target quality condition of the target IPR template; and for selecting a SRv6 TE Policy meeting the target quality condition from the target IPR template, wherein the SRv6 TE Policy includes a first candidate path;
- a forwarding module for forwarding the service packet through the first candidate path;
- wherein each IPR template includes multiple SRv6 TE Policies with a same service attribute and a quality condition corresponding to the service attribute, wherein the multiple SRv6 TE Policies have different link priorities, and the selected SRv6 TE Policy has a highest link priority.

In a third aspect, an example of the present disclosure provides an electronic device, including:

- a processor;
- a transceiver;
- a machine-readable storage medium storing machine-executable instructions that can be executed by the processor; the machine-executable instructions cause the processor to execute following processes:
- receiving a service packet having a destination address and a flow characteristic;
- obtaining a target service attribute matching the flow characteristic and obtaining at least one IPR template matching the destination address;
- selecting a target IPR template matching the target service attribute from the at least one IPR template, and obtaining a target quality condition of the target IPR template;
- selecting a SRv6 TE Policy that meets the target quality condition from the target IPR template, wherein the SRv6 TE Policy includes a first candidate path;
- forwarding the service packet through the first candidate path;
- wherein each IPR template includes multiple SRv6 TE Policies with a same service attribute and a quality condition corresponding to the service attribute, wherein the multiple SRv6 TE Policies have different link priorities, and the selected SRv6 TE Policy has a highest link priority.

In a fourth aspect, an example of the present disclosure provides a computer-readable storage medium storing a computer program, wherein the computer program, when executed by a processor, carries out the method described in the first aspect.

In a fifth aspect, an example of the present disclosure provides a computer program product containing executable instructions, where the executable instructions, when executed on a computer, cause the computer to carry out the method described in the first aspect.

By adopting the above technical solutions, after receiving a service packet, a headend obtains the target service attribute matching the flow characteristic and obtains at least one IPR template matching the destination address. Then, the headend selects a target IPR template matching the target service attribute from the at least one IPR template, and obtains the target quality condition of the target IPR template. Further, the headend selects, from the target IPR template, a SRv6 TE Policy that meets the target quality condition, with the selected SRv6 TE Policy having the highest link priority, and then forwards the service packet through the first candidate path included in the selected SRv6 TE Policy. It can be seen that the examples of the present disclosure firstly select the SRv6 TE Policy that meets the target quality condition and has the highest link priority instead of directly selecting the SRv6 TE Policy having the highest link priority. Since the first candidate path meets the target quality condition, forwarding the service packet using the first candidate path can meet the SLA requirements of SLA, avoiding the use of candidate paths with poor path quality for forwarding service packets, thereby improving service quality.

Of course, it is not necessary for any product or method of the disclosure to achieve all the advantages described above at the same time.

DETAILED DESCRIPTION

The following provides a clear and comprehensive description of the technical solution in the examples of the present disclosure, in conjunction with the drawings in the examples. Obviously, the described examples are merely some, and not all, of the examples of the present disclosure. Based on the examples of the present disclosure, all other examples derived by ordinary technicians in the art based on the present disclosure fall within the scope of protection of the present disclosure.

Firstly, an introduction to the application scenario provided in the example of the present disclosure is given.

Figure 1:
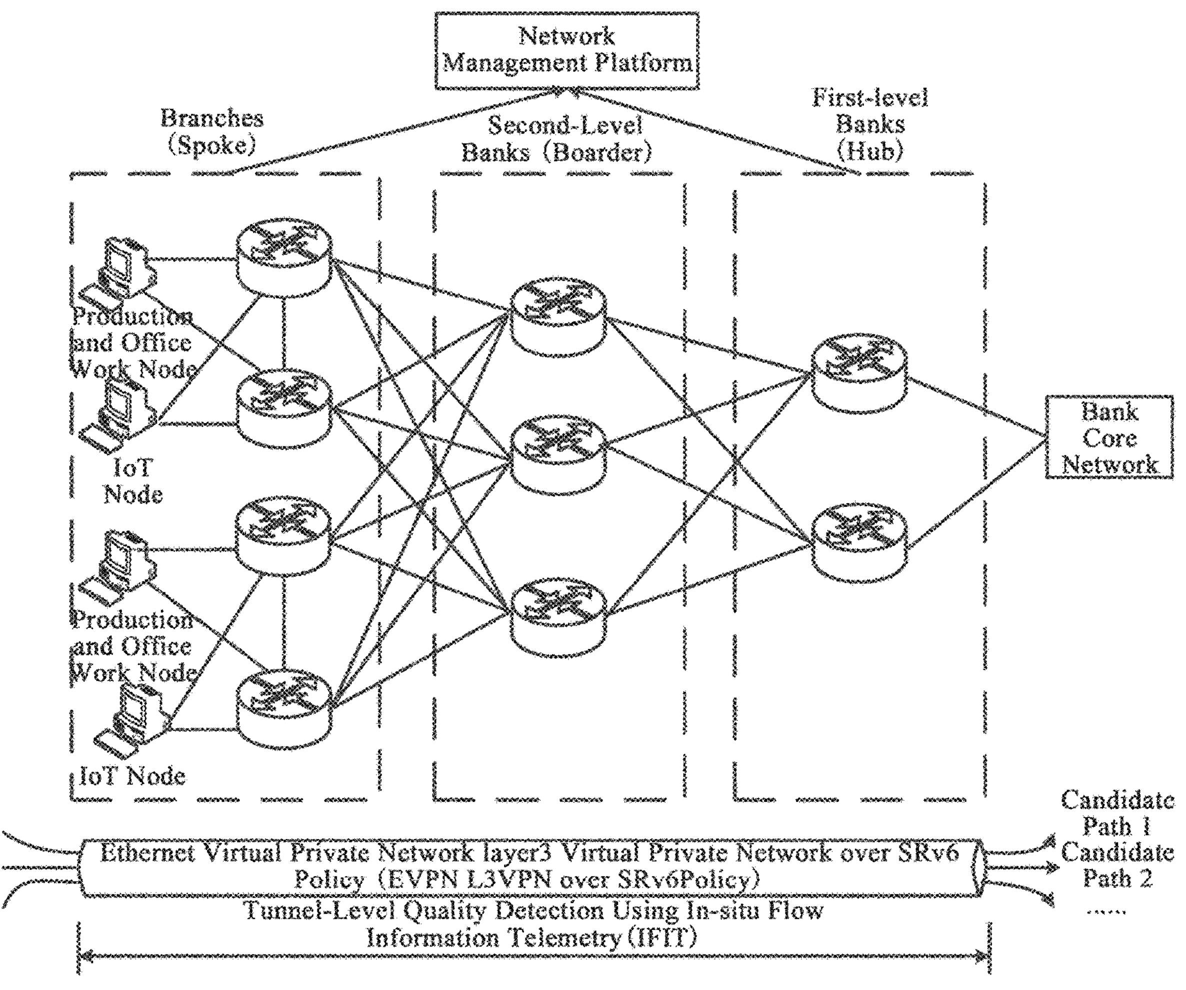
FIG. 1 is a structural diagram of a bank access network provided based on an example of the present disclosure.

As shown in FIG. 1, which is a structural diagram of a bank access network provided in the example of the present disclosure, the bank access network includes branches (Spoke), second-level banks (Boarder), first-level banks (Hub), and a bank core network. The branches include nodes for production and office work, nodes for IoT (Internet of Things), and so on.

The branches are communicatively connected to the second-level banks, and the second-level banks are communicatively connected to the first-level banks. Service packets can be mutually forwarded between the branches and the first-level banks. The first-level banks are communicatively connected to the bank core network, and mutual access between the first-level banks and the data centre can be achieved through communication between the first-level banks and the bank core network. Additionally, the branches and the first-level banks can also upload service packets to a network management platform through the Telemetry protocol.

Each node in the bank access network is deployed with a SRv6 TE Policy, which supports deployment in various network environments. As an example, the SRv6 TE Policy in FIG. 1 is deployed in Ethernet Virtual Private Network layer3 Virtual Private Network over SRv6 Policy (EVPN L3VPN over SRv6 Policy). The SRv6 TE Policy includes multiple candidate paths, such as candidate path 1, candidate path 2, and so on. In addition, the path quality of the candidate paths in the SRv6 TE Policy can be detected based on tunnel-level quality detection using In-situ Flow Information Telemetry (IFIT).

In related technologies, after receiving service packets, a first-level bank may steer the service packets into the SRv6 TE Policy and forward the service packets using the forwarding path in the SRv6 TE Policy. However, when the path quality of the forwarding path in the SRv6 TE Policy deteriorates, it may fail to meet the requirements of the traffic for the Service Level Agreement (SLA), thereby affecting the service quality.

Below, relevant technical terminologies involved in the examples of the present disclosure are explained.

Segment Routing (SR) adopts a headend path selection mechanism, where the segment identifiers (SID) of segments that the path will traverse are pre-encapsulated at the headend. When a packet passes through an SR node, the SR node forwards the packet based on the SIDs of the forwarded packet. Nodes other than the headend do not need to maintain states of the path. SRv6 refers to the use of SR in IPv6 networks, where IPv6 addresses are used as SIDs for packet forwarding.

SRv6 TE Policy is a tunnel-based traffic steering technology developed based on SRv6 technology. One SRv6 TE Policy consists of multiple candidate paths with different priorities, and each candidate path includes one or more forwarding paths identified by a segment list. The segment list is an end-to-end path from a source node to a destination node and is used to instruct apparatuses in the SRv6 network to follow the path specified by the segment list instead of the shortest path calculated by the Internal Gateway Protocol (IGP). In response to a determination that a packet is steered into a SRv6 TE Policy, the headend adds the segment list to the packet, and the other apparatuses in the SRv6 network execute instructions embedded in the segment list.

One SRv6 TE Policy can be uniquely identified globally by a following tuple comprising a headend, a color and an endpoint.

The headend is a node that generates a SRv6 TE Policy and is used to steer service packets into the SRv6 TE Policy.

The color is an extended community attribute carried by the SRv6 TE Policy; and BGP (Border Gateway Protocol) routes carrying the same color attribute as that of the SRv6 TE Policy can use this SRv6 TE Policy.

The endpoint is an IPv6 address of a destination node of the SRv6 TE Policy.

Currently, service packets can be steered into the appropriate SRv6 TE Policy based on a color value, a tunnel policy, and other traffic steering methods.

Taking color value-based traffic steering as an example, after receiving a service packet, the headend looks up a routing table to obtain a next-hop address and a color value in the routing table entry that matches the received service packet, and then finds a SRv6 TE Policy with the same endpoint address as the next-hop address and the same color value as the color value in the routing table entry, and then forwards the traffic packet through that SRv6 TE Policy.

Tunnel policy-based traffic steering refers to the process where, after receiving a service packet, the headend looks up a routing table to obtain a next-hop address in the routing table entry that matches the service packet, finds a SRv6 TE Policy or a SRv6 TE Policy group that matches the next-hop address, and then forwards the service packet through the matched SRv6 TE Policy or the matched SRv6 TE Policy group.

An SRv6 TE Policy group is a set of SRv6 TE Policies with the same endpoint address. Based on packet identification information such as the Differentiated Services Code Point (DSCP) or Dot1p value, packets can be mapped to SRv6 TE Policies with different color values within the SRv6 TE Policy group for forwarding, thereby achieving differentiated forwarding control based on different identification information of the traffic.

An SRv6 TE Policy group is identified by a Group ID, and the SRv6 TE Policy group also has a color value and an endpoint attribute.

The color value is an extended community attribute carried by the SRv6 TE Policy group, and BGP routes carrying the same color attribute as that of the SRv6 TE Policy group can be iterated to this SRv6 TE Policy group.

The endpoint is the IPv6 address of the destination node of the SRv6 TE Policy group. In response to a determination that one SRv6 TE Policy has the same endpoint as that of the SRv6 TE Policy group, then that SRv6 TE Policy belongs to this SRv6 TE Policy group.

As a new technology, SRv6 TE Policy provides a flexible forwarding path selection method that can meet different forwarding needs of users. When multiple SRv6 TE Policy paths exist between a headend and a destination node in a SRv6 network, by effectively utilizing SRv6 TE Policy to select the forwarding path, it can not only facilitate network management and planning for administrators but also effectively reduce the forwarding load of network apparatuses.

Prior to forwarding service packets using the SRv6 TE Policy, the SRv6 TE Policy needs to be configured. Below, the process of configuring the SRv6-TE Policy is explained.

The main process for configuring a SRv6 TE Policy is as follows: first, configuring a color value of a BGP route; then configuring tunnel-based traffic steering policies, wherein four tunnel-based traffic steering policies are exemplarily illustrated: steering traffic into a SRv6 TE Policy based on the color value, steering traffic into a SRv6 TE Policy based on a Differentiated Services Code Point (DSCP), steering traffic into a SRv6 TE Policy based on a Service Class, and steering traffic into a SRv6 TE Policy based on a Traffic Engineering Class (TE-Class), and the actual implementation of tunnel-based traffic steering policies is not limited to these policies; finally, configuring different tunnel-based traffic steering policies for specific services, for example, configuring, for a first service, a tunnel-based traffic steering policy that steers traffic based on DSCP and configuring, for a second service, a tunnel-based traffic steering policy that steers traffic based on TE-Class.

It should be understand that multiple SRv6 TE Policies with the same endpoint can form one SRv6 TE Policy group. Each SRv6 TE Policy in the SRv6 TE Policy group has its own color value. By specifying the mapping relationship between color values and packet attributes such as DSCP, TE-Class, Service-Class, 802.1p, and so on, a mapping relationship among a certain packet attribute (DSCP, TE-Class, Service-Class, or 802.1p), color value, and SRv6 TE Policy can be formed through the correlation by means of color values.

By taking steering traffic into a SRv6 TE Policy based on TE-Class as an example, the following introduces the SRv6-TE Policy traffic steering process. For other tunnel-based traffic steering policies, relevant protocol specifications can be referred to and are not introduced here one by one.

The basic principle of traffic steering based on TE-Class is to steer a packet into the corresponding SRv6 TE Policy based on a TE-Class value of the packet. This traffic steering method requires first deploying a SRv6 TE Policy group and steering traffic into the SRv6 TE Policy group, and then steering a packet with a specific TE-Class value into the corresponding SRv6 TE Policy based on the mapping rule in the SRv6 TE Policy group.

The working mechanism of traffic steering based on TE-Class is as follows:

Process 1: steering service traffic into the SRv6 TE Policy group using any of the following modes:

Mode 1: configuring a tunnel policy and binding a specified destination address to the SRv6 TE Policy group in the tunnel policy, thereby steering traffic destined for that destination address to the SRv6 TE Policy group.

Mode 2: configuring a tunnel policy and specifying the SRv6 TE Policy group as a preferred tunnel in the tunnel policy. In response to a determination that a next-hop address of the route is a destination address of the SRv6 TE Policy group, the traffic is steered into that SRv6 TE Policy group.

Mode 3: after finding a SRv6 TE Policy group of which the color value and endpoint address match the color extended community attribute and next-hop address of a BGP route, iterating that BGP route to the SRv6 TE Policy group.

Process 2: automatically adding multiple SRv6 TE Policies with different color values to one SRv6 TE Policy group, and defining the mapping relationship between TE-Class values and color values in the SRv6 TE Policy group.

Process 3: looking up a color value associated with a TE-Class value of a packet based on the TE-Class value, and then obtaining a matched SRv6 TE Policy corresponding to the color value in the SRv6 TE Policy group through this color value. This is equivalent to forming a mapping relationship of TE-Class value→color value→SRv6 TE Policy, thereby enabling a packet carrying a specified TE-Class value to be forwarded through the specified SRv6 TE Policy.

Figure 2:
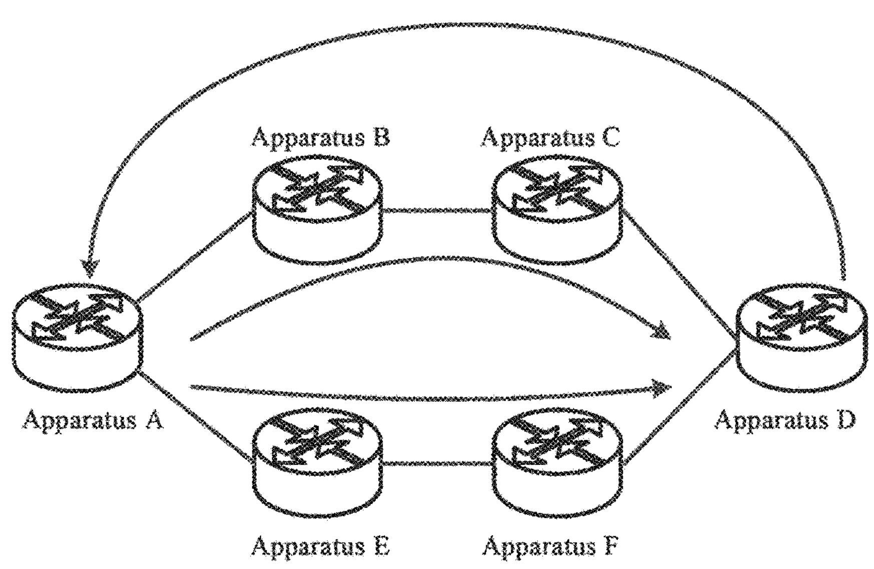
FIG. 2 is an exemplary diagram of a SRv6 TE traffic steering process provided based on an example of the present disclosure.

As shown in FIG. 2, taking the networking structure shown in FIG. 2 as an example, a process of traffic steering based on TE-Class is introduced.

In FIG. 2, there are two SRv6 TE Policies between the headend (Apparatus A) and the endpoint (Apparatus D), namely SRv6 TE Policy 1 and SRv6 TE Policy 2. The color value of SRv6 TE Policy 1 is 100, and the forwarding path included in SRv6 TE Policy 1 is: Apparatus A→Apparatus B→Apparatus C→Apparatus D; the color value of SRv6 TE Policy 2 is 200, and the forwarding path included in SRv6 TE Policy 2 comprising: Apparatus A→Apparatus E→Apparatus F→Apparatus D. The endpoint addresses of both SRv6 TE Policy 1 and SRv6 TE Policy 2 are the address 4::4 of the Apparatus D. The traffic steering processes are as follows:

Traffic steering process 1: Apparatus D sends, to Apparatus A, an MP-BGP route with an IP prefix 2.2.2.2/32, a color value of 100, and a next hop address 4::4 being an IP address of Apparatus D.

Traffic steering process 2: a SRv6 TE Policy group 111 is created on Apparatus A, with a color value of 10 and an endpoint being the address 4::4 of Apparatus D. Within SRv6 TE Policy group 111, a mapping relationship between color values and TE class IDs is defined, where the color value of 100 is mapped to TE class ID 1, and the color value of 200 is mapped to TE class ID 2. Afterward, a tunnel policy is configured on Apparatus A to bind SRv6 TE Policy group 111 to the destination address 2.2.2.2.

SRv6 TE Policy group 111 includes SRv6 TE Policy 1 and SRv6 TE Policy 2. SRv6 TE Policy 1 has a color value of 100, an endpoint of the address 4::4 of Apparatus D, and an Segment list including the IPv6 addresses of Apparatus B, Apparatus C, and Apparatus D. SRv6 TE Policy 2 has a color value of 200, an endpoint of the address 4::4 of Apparatus D, and an Segment list including the IPv6 addresses of Apparatus E, Apparatus F, and Apparatus D.

By binding SRv6 TE Policy group 111 to the destination address 2.2.2.2 on Apparatus A, a Forwarding Information Base (FIB) can be generated. The FIB includes a mapping relationship of TE class ID 1→color value of 100→SRv6 TE Policy 1, as well as a mapping relationship of TE class ID 2→color value of 200→SRv6 TE Policy 2.

Traffic steering process 3: after receiving a packet, Apparatus A finds the matched tunnel policy based on the destination address of the packet, which is then associated with the SRv6 TE Policy group. Apparatus A then looks up the color value to which the TE class ID of the packet is mapped based on the TE class ID, and obtains one specific matched SRv6 TE Policy within the SRv6 TE Policy group based on the color value. The optimal candidate path is selected within this SRv6 TE Policy. Taking the optimal candidate path included in the SRv6 TE Policy 1 as an example, packets with a TE class ID value of 1 are forwarded along the path Apparatus B→Apparatus C→Apparatus D based on the Segment list in this candidate path, thereby achieving packet steering based on TE class ID.

In the above process, application-level network SLA policies are defined by using color values, enabling static network path planning based on specific services and achieving service value segmentation. This means that SRv6 TE Policies are pre-planned for services. However, when the path quality of candidate paths included in the SRv6 TE Policies deteriorates, the SLA requirements of the services will not be met if service packets are still forwarded along those candidate paths.

Figure 3:
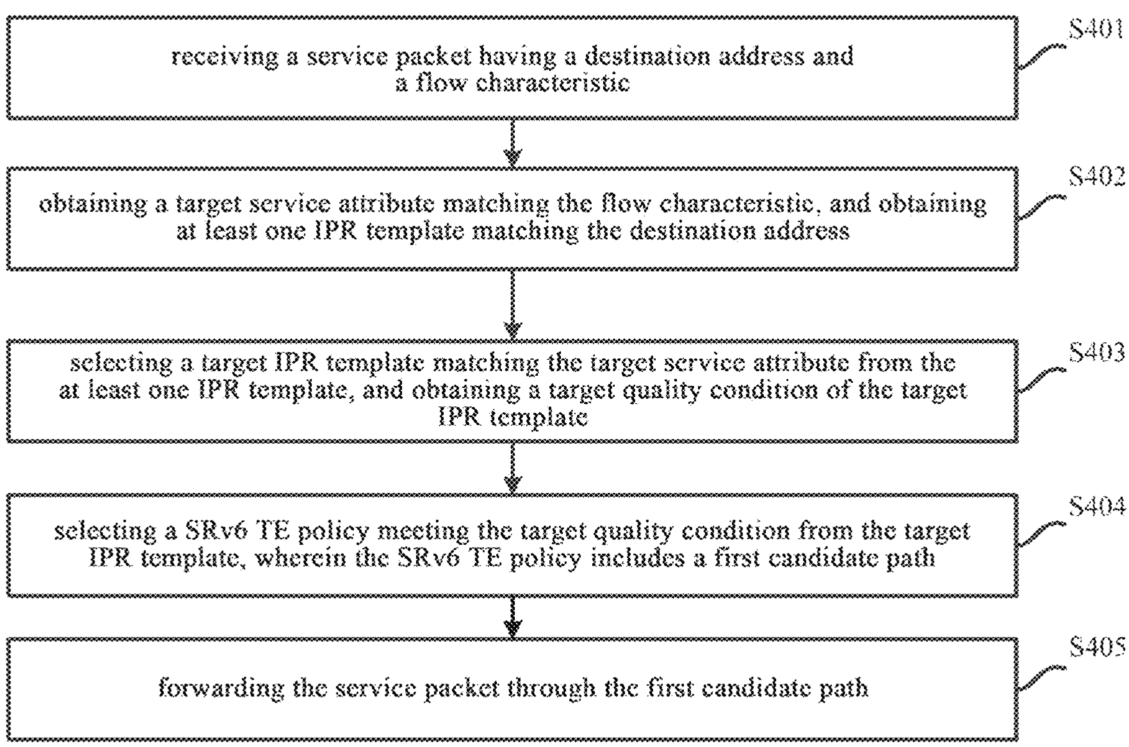
FIG. 3 is a schematic diagram of a method for packet forwarding provided based on an example of the present disclosure.

To address this issue, the present disclosure provides a method for packet forwarding applied to a headend in a SRv6 network, as shown in FIG. 3. The method includes:

Process S401: receiving a service packet having a destination address and flow characteristic.

The flow characteristic of the service packet may include information used to identify a service flow, such as a five-tuple, DSCP, and VPN identifier, etc., which is not limited in the present disclosure.

Process S402: obtaining a target service attribute matching the flow characteristic, and obtaining at least one intelligent policy routing (IPR) template matching the destination address.

A correspondence between flow characteristics and service attributes which can be represented by TE-Class, is pre-stored in the headend. The headend can determine the target service attribute based on this correspondence.

At least one IPR template belongs to the same SRv6 TE Policy group, which matches the destination address of the service packet.

The headend can determine the SRv6 TE Policy group matching the destination address of the service packet through methods such as color-based traffic steering or tunnel-based traffic steering.

For example, in response to a determination that the tunnel-based traffic steering method is used, a routing table can be searched based on the destination address of the service packet to obtain a next-hop address for forwarding the service packet, and then obtain the SRv6 TE Policy group with the same endpoint address as the next-hop address. The obtained SRv6 TE Policy group is the one matching the destination address.

In response to a determination that the color-based traffic steering method is used, a routing table can be searched based on the destination address of the service packet to obtain the matched next-hop address and the matched color value, and then obtain the SRv6 TE Policy group with the same endpoint address as the next-hop address. In response to a determination that a color value of the SRv6 TE Policy group matches the color value obtained from the routing table, the SRv6 TE Policy group is the one matching the destination address.

The headend can also select, based on configurations, other traffic steering methods to steer the service packet into the SRv6 TE Policy group matching the destination address, with specific traffic steering methods referable to relevant protocol specifications, and the present disclosure does not limit this.

The SRv6 TE Policy group includes multiple SRv6 TE Policies with the same endpoint address, and each SRv6 TE Policy corresponds to a service attribute. In examples of the present disclosure, multiple SRv6 TE Policies with the same service attribute in the SRv6 TE Policy group are added to one IPR template, and one SRv6 TE Policy group includes at least one IPR template.

Each IPR template includes multiple SRv6 TE Policies with the same service attribute and a quality condition corresponding to this service attribute, and the multiple SRv6 TE Policies have different link priorities.

Process S403: selecting a target IPR template matching the target service attribute from the at least one IPR template, and obtaining a target quality condition of the target IPR template.

The headend can determine the target IPR template matching the target service attribute based on the correspondence between service attributes and IPR templates.

The target IPR template includes the target quality condition, which can also be referred to as an SLA criterion, such as the target quality condition can include an upper limit of bandwidth occupation of <80%.

The target IPR template includes the target quality condition and routing priority information for SRv6 TE Policies with the same service attribute.

As an example, the routing priority information for SRv6 TE Policies includes:

SRv6 TE Policy A priority (link priority) 10, an expected bandwidth BW_A, a first label outgoing interface intA, scheduling priority priA.

SRv6 TE Policy B priority 20, an expected bandwidth BW_B, a first label outgoing interface intB, a scheduling priority priB.

SRv6 TE Policy C priority 30, an expected bandwidth BW_C, a first label outgoing interface intC, a scheduling priority priC.

Process S404: selecting a SRv6 TE policy meeting the target quality condition from the target IPR template, wherein the SRv6 TE policy includes a first candidate path.

The selected SRv6 TE Policy has the highest link priority.

As an example, in response to a determination that SRv6 TE Policy B and SRv6 TE Policy C meet the target path quality condition and the link priority of SRv6 TE Policy B is higher than that of SRv6 TE Policy C, the primary candidate path included in SRv6 TE Policy B is set as the first candidate path.

Process S405: forwarding the service packet through the first candidate path.

By adopting the above technical solution, after receiving a service packet, the headend obtains the target service attribute matching the flow characteristic and obtains at least one IPR template matching the destination address. Then, the headend selects the target IPR template matching the target service attribute from the at least one IPR template and obtains the target quality condition of the target IPR template. Further, the headend selects, from the target IPR template, a SRv6 TE Policy that meets the target quality condition, with the selected SRv6 TE Policy having the highest link priority. The service packet is then forwarded through the first candidate path included in the selected SRv6 TE Policy. It can be seen that the example of the present disclosure firstly selects the SRv6 TE Policy that meets the target quality condition and has the highest link priority instead of directly selecting the SRv6 TE Policy having the highest link priority. Since the first candidate path meets the target quality condition, forwarding the service packet through the first candidate path can meet the SLA requirements of the service, avoiding the use of candidate paths with poor quality for forwarding service packets, thereby improving service quality.

In the examples of the present disclosure, the target IPR template further includes a preset period, which is a period for the headend to select an optimal candidate path for the target IPR template. The optimal candidate path is the first candidate path in the aforementioned example.

In one implementation, the headend performs the following operations every preset period:

obtaining a path quality parameter of a primary candidate path included in each SRv6 TE policy in the target IPR template; adding the primary candidate path included in the SRv6 TE policy, in which the path quality parameter meets the target quality condition, to a candidate path set; setting a candidate path with a highest link priority from the candidate path set as the first candidate path.

It can be understood that for each SRv6 TE Policy in the target IPR template, in response to a determination that the path quality parameter of the primary candidate path included in the SRv6 TE Policy does not meet the target quality condition, then the primary candidate path included in the SRv6 TE Policy is considered as an inferior path and cannot be used for subsequent service forwarding. Conversely, in response to a determination that the path quality parameter of the primary candidate path included in the SRv6 TE Policy meets the target quality condition, then the primary candidate path included in the SRv6 TE Policy can be added to the candidate path set as one candidate path.

In this way, an optimal candidate path can be reselected for the target IPR template every preset period. After the service packet is steered into the target IPR template, the optimal candidate path can be used to forward the service packet. This avoids continuing to use a forwarding path with degraded path quality which is used by the current service flow for service packet forwarding and enables timely switching to the latest selected optimal candidate path, thereby improving service quality.

In another possible implementation, the headend performs the following operations every preset period:

obtaining the path quality parameter of a primary candidate path included in each SRv6 TE policy in the target IPR template; determining whether the path quality parameter of the primary candidate path included in each SRv6 TE policy in the target IPR template meets the target quality condition; adding the primary candidate path included in the SRv6 TE policy of which the path quality parameter meets the target quality condition, to a candidate path set; selecting a second candidate path with a highest link priority from the candidate path set; setting the second candidate path selected within a preset duration as the first candidate path in response to a determination that the second candidate path is different from a currently used candidate path. The currently used candidate path is the first candidate path.

It should be noted that, in response to a determination that there are multiple SRv6 TE Policies with the same link priority in the candidate path set and the link priority of the multiple SRv6 TE Policies is the highest in the candidate path set, then the second candidate paths included in the multiple SRv6 TE Policies with the same link priority can all be considered as optimal paths, and subsequent traffic can be load-shared among the multiple SRv6 TE Policies.

In the examples of the present disclosure, after the headend selects the second candidate path, in response to a determination that the second candidate path is different from the currently used candidate path, a switching and switching back suppression can be performed. Specifically, a switching period timer can be started; in response to a determination that the second candidate path with the highest link priority calculated before the timing duration from the starting of the timer reaches the preset duration, is the same as the currently used candidate path, the switching period timer is stopped and reset, and the currently used candidate path is still used until the next calculated second path is different from the currently used candidate path and the timer is restarted. In some examples, there are multiple second candidate paths calculated before the timing duration from the starting of the timer reaches the preset duration, the currently used candidate path will not be switched in response to a determination that the multiple second candidate paths are the same as currently used candidate paths.

In response to a determination that the second candidate path with the highest link priority calculated before the timing duration from the starting of the timer reaches the preset duration, is different from the currently used candidate path, the second candidate path is set as the first candidate path. That is, the second candidate path is set as the optimal candidate path, and subsequent service packets steered into the target IPR template will be forwarded using the second candidate path. In some examples, there are multiple second candidate paths calculated before the timing duration from the starting of the timer reaches the preset duration, the currently used candidate path will be switched in response to a determination that any one of the multiple second candidate paths is different from the currently used candidate paths.

During the above process, in response to a determination that the link priority of the second candidate path is lower than the link priority of the currently used candidate path, a path switching is required, i.e., the currently used forwarding path is switched from a high-link-priority candidate path to the second candidate path having a low link priority.

In response to a determination that the link priority of the second candidate path is higher than the link priority of the currently used candidate path, it indicates that the path quality of the second candidate path has recovered to a high quality after degradation, so a path switching back is required, i.e., the currently used forwarding path is switched from a low-priority candidate path to the second candidate path having a high priority.

The preset duration is a preset duration matching with the target service attribute and included in the target IPR template, and the preset duration is the switching period of the path. In the examples of the present disclosure, preset durations matched with different service attributes can be preset based on service characteristics. For example, a shorter preset duration can be set for voice services with high real-time requirements.

By adopting this method and setting the preset duration, the impact of path switching on services can be reduced, and the service quality of critical traffic can be ensured. For example, after switching from a high-link-priority candidate path to a low-link-priority candidate path, in response to a determination that the high-link-priority candidate path is recovered to normal, it is necessary to switch back from the low-link-priority candidate path to the high-link-priority candidate path. At this time, in a case that there is still important traffic being transmitted on the low-link-priority candidate path, the switching back action may cause traffic loss. In the examples of the present disclosure, the switching back may only occur after the preset duration, ensuring the reliability of important traffic transmission on the low-link-priority path during this period.

In another possible implementation, the headend performs the following operations every preset period:

obtaining a path quality parameter of a primary candidate path included in each SRv6 TE Policy in the target IPR template; determining whether the path quality parameter of the primary candidate path included in each SRv6 TE Policy in the target IPR template meets the target quality condition in a sequence of link priorities from high to low; setting a primary candidate path which is the first one that meets the target quality condition, as a third candidate path; and setting the third candidate path selected within a preset duration as the first candidate path in response to a determination that the third candidate path is different from the currently used candidate path.

In response to a determination that multiple SRv6 TE Policies in the target IPR template have the same link priority, primary candidate paths included in the multiple SRv6 TE Policies all meet the target path quality condition, and there is no SRv6 TE Policy having a higher link priority than that of the multiple SRv6 TE Policies in the target IPR template, or primary candidate paths included in SRv6 TE Policies having a higher link priority than that of the multiple SRv6 TE Policies all do not meet the target path quality condition, then each primary candidate path included in the multiple SRv6 TE Policies having the same link priority is set as the third candidate path. Subsequently, in response to a determination that the third candidate path needs to be set as the first candidate path, traffic is to be load-balanced among the primary candidate paths included in the multiple SRv6 TE Policies with the same link priority.

By adopting this method, the primary candidate path that meets the target quality condition can be selected in a sequence of link priorities from high to low, and the optimal candidate path (i.e., the third candidate path) can be quickly determined. After determining the optimal candidate path, there is no need to continue determining whether primary candidate paths included in other SRv6 TE Policies meet the target quality condition, which can save the processing overhead and improve the efficiency.

In some examples of the present disclosure, at least two SRv6 TE Policies in the target IPR template share a first outgoing interface. The currently used candidate path includes the primary candidate paths of the at least two SRv6 TE Policies, and a fourth candidate path among the primary candidate paths of the at least two SRv6 TE Policies has a lowest scheduling priority. In some examples, there can be multiple fourth candidate paths.

Accordingly, in the aforementioned example, the process of setting the second candidate path selected within the preset duration as the first candidate path in response to a determination that the second candidate path is different from the currently used candidate path, can be implemented specifically as follows:

Setting the second candidate path selected within the preset duration as the first candidate path for replacing the fourth candidate path in response to a determination that the second candidate path is different from the fourth candidate path.

That is, in response to a determination that each of the path quality parameters of the primary candidate paths of at least two SRv6 TE Policies sharing the first outgoing interface does not meet the target quality condition, it indicates that the available bandwidth of the first outgoing interface is insufficient. In this case, the traffic forwarded based on the primary candidate paths of the at least two SRv6 TE Policies can be gradually switched to other candidate paths, i.e., the switching can be performed in multiple processes. In the current preset period, the traffic forwarded based on the fourth candidate path having the lowest scheduling priority is first switched to the first candidate path, and the traffic forwarded based on other SRv6 TE Policies sharing the first outgoing interface is temporarily not switched.

In the next preset period, in response to a determination that the path quality parameter of a fifth candidate path having a second-lowest priority among the primary candidate paths of at least two SRv6 TE Policies sharing the first outgoing interface still does not meet the target quality condition, the traffic forwarded based on the fifth candidate path is then switched to the first candidate path selected in this preset period. This allows the traffic forwarded based on one SRv6 TE Policy for the first outgoing interface to be switched in each preset period, achieving gradual switching.

It should be noted that, in response to a determination that all of the path quality parameters of the primary candidate paths of all SRv6 TE Policies included in the target IPR template do not meet the target quality condition, no path switching is performed.

Accordingly, in response to a determination that at least two SRv6 TE Policies in the target IPR template share the first outgoing interface, the currently used candidate path includes the primary candidate paths of the at least two SRv6 TE Policies, and the fourth candidate path among the primary candidate paths of the at least two SRv6 TE Policies has the lowest scheduling priority, then the process of setting the third candidate path selected within the preset duration as the first candidate path in response to a determination that the third candidate path is different from the currently used candidate path, can be implemented specifically as follows:

Setting the third candidate path selected within the preset duration as the first candidate path for replacing the fourth candidate path in response to a determination that the third candidate path is different from the fourth candidate path.

That is, the traffic forwarded based on one SRv6 TE Policy for the first outgoing interface can be switched in each preset period, achieving gradual switching.

The method for determining whether each candidate path meets the target quality condition is introduced below.

The process of acquiring the path quality parameter of the primary candidate path included in each SRv6 TE Policy in the target IPR template in the aforementioned example includes:

Process 1: acquiring the used bandwidth and total bandwidth of an outgoing interface corresponding to the primary candidate path of each SRv6 TE Policy in the target IPR template.

The outgoing interface is the first label physical outgoing interface of the Segment List of the primary candidate path of the SRv6 TE Policy and is one outgoing interface of the headend.

Process 2: acquiring a real-time quality parameter and an expected quality parameter of the primary candidate path of each SRv6 TE Policy in the target IPR template, where the real-time quality parameter includes at least a real-time bandwidth, and the expected quality parameter includes at least an expected bandwidth.

The headend of the SRv6 TE Policy group has enabled the real-time traffic statistical function of the SRv6 TE Policy, through which real-time quality parameters of different SRv6 TE Policies in the SRv6 TE Policy group can be detected. The real-time quality parameter includes at least a real-time bandwidth and optionally may also include a transmission delay, a packet loss rate, etc. Correspondingly, the expected quality parameter may also include an expected transmission delay and an expected packet loss rate.

It should be noted that, in response to a determination that there are multiple Segment Identifier (SID) lists in a primary candidate path, that is, there are multiple forwarding paths, and there is traffic in each of the multiple forwarding paths, then a real-time quality parameter of each forwarding path need to be measured. Then, based on the weights of the Segment lists, a weighted sum of the real-time quality parameters of the forwarding paths corresponding to the Segment lists is calculated. The weighted sum is set as the real-time quality parameter of the primary candidate path.

The expected quality parameter is a parameter statically configured for the SRv6 TE Policy. The expected quality parameter includes at least the expected bandwidth and optionally may also include the expected transmission delay and expected packet loss rate.

Optionally, in response to a determination that the headend has not enabled the real-time traffic statistical function, the expected quality parameter of the SRv6 TE Policy can be set as the real-time quality parameter.

Accordingly, after obtaining the path quality parameter of the primary candidate path included in each SRv6 TE Policy in the target IPR template, the method further includes:

Process A: for each SRv6 TE Policy in the target IPR template, determining whether the used bandwidth and total bandwidth of the outgoing interface corresponding to the SRv6 TE Policy, and the real-time quality parameter or the expected quality parameter of the primary candidate path of the SRv6 TE Policy, meet the target quality condition.

In response to a determination that the used bandwidth and total bandwidth of the outgoing interface corresponding to the SRv6 TE Policy, and the real-time quality parameter or the expected quality parameter of the primary candidate path of the SRv6 TE Policy, meet the target quality condition, proceed to Process B; in response to a determination that the used bandwidth and total bandwidth of the outgoing interface corresponding to the SRv6 TE Policy, and the real-time quality parameter or the expected quality parameter of the primary candidate path of the SRv6 TE Policy, do not meet the target quality condition, proceed to Process C.

In one example, the target quality condition includes an upper threshold value for the bandwidth occupation rate. Correspondingly, the bandwidth can be used to determine whether the target quality condition is met, i.e., Process A specifically includes:

for each SRv6 TE Policy in the target IPR template, determining whether the bandwidth occupation rate of the SRv6 TE Policy is greater than the upper threshold value based on the used bandwidth and total bandwidth of the outgoing interface corresponding to the SRv6 TE Policy, as well as the real-time quality parameter or the expected quality parameter of the primary candidate path of the SRv6 TE Policy; in response to a determination that the bandwidth occupation rate of the SRv6 TE Policy is greater than the upper threshold value, determining that the target quality condition is met; in response to a determination that the bandwidth occupation rate of the SRv6 TE Policy is not greater than the upper threshold value, determining that the target quality condition is not met.

Determining whether the bandwidth occupation rate of the SRv6 TE Policy is greater than the upper threshold value specifically includes the following two scenarios:

Scenario 1: in response to a determination that no traffic is forwarded based on the SRv6 TE Policy currently, determining an expected occupied bandwidth for traffic of the target service attribute based on the real-time bandwidth or the expected bandwidth of the primary candidate path of the SRv6 TE Policy, and determining a sum of the used bandwidth of the outgoing interface corresponding to the SRv6 TE Policy and the expected occupied bandwidth; setting a product of the total bandwidth of the outgoing interface corresponding to the SRv6 TE Policy and the upper threshold value as an upper limit of bandwidth occupation; determining whether the sum is less than the upper limit of bandwidth occupation.

This can be understood as determining whether (the used bandwidth of the outgoing interface corresponding to the SRv6 TE Policy+the expected occupied bandwidth)<(the total bandwidth of the outgoing interface corresponding to the SRv6 TE Policy*the upper threshold value) is established.

In response to a determination that the sum is less than the upper limit of bandwidth occupation, determining that the target quality condition is met; in response to a determination that the sum is not less than the upper limit of bandwidth occupation, determining that the target quality condition is not met.

The process for determining the expected occupied bandwidth is as follows:

in response to a determination that the traffic of the target service attribute has not been forwarded based on the primary candidate path of the SRv6 TE Policy, the expected bandwidth of the primary candidate path of the SRv6 TE Policy is set as the expected occupied bandwidth. In response to a determination that the SRv6 TE Policy firstly participates in routing and the traffic of the target service attribute has not been forwarded based on the SRv6 TE Policy, the expected bandwidth which is preconfigured can be set as the expected occupied bandwidth.

In response to a determination that the traffic of the target service attribute has been forwarded based on the primary candidate path of the SRv6 TE Policy, an average value of real-time bandwidths of the primary candidate path of the SRv6 TE Policy obtained within a preset number of preset periods is set as the expected occupied bandwidth. The headend can record the real-time quality parameter of each SRv6 TE Policy in each preset period, for example, in the form of a table. Furthermore, the headend can obtain the real-time bandwidths of the SRv6 TE Policy obtained within the latest preset number of periods and then take the average value of the real-time bandwidths as the expected occupied bandwidth. This allows for a more accurate prediction of the expected occupied bandwidth for carrying traffic of the target service attribute and a calculation of whether the primary candidate path of the SRv6 TE Policy will still meet the target quality condition in a case that the traffic of the target service attribute is forwarded based on the primary candidate path of the SRv6 TE Policy, thereby enabling a more accurate selection of the optimal path for traffic of the target service attribute.

Scenario 2: in response to a determination that traffic has been forwarded based on the SRv6 TE Policy currently, setting the product of the total bandwidth of the outgoing interface corresponding to the SRv6 TE Policy and the upper threshold value as the upper limit of bandwidth occupation; determining whether the used bandwidth of the outgoing interface corresponding to the SRv6 TE Policy is less than the upper limit of bandwidth occupation;

This can be understood as determining whether the used bandwidth of the outgoing interface corresponding to the SRv6 TE Policy<(the total bandwidth of the outgoing interface corresponding to the SRv6 TE Policy*the upper threshold value) is established.

In response to a determination that the used bandwidth of the outgoing interface corresponding to the SRv6 TE Policy is less than the upper limit of bandwidth occupation, it is determined that the target quality condition is met; in response to a determination that the used bandwidth of the outgoing interface corresponding to the SRv6 TE Policy is not less than the upper limit of bandwidth occupation, it is determined that the target quality condition is not met.

It can be understood that, in response to a determination that the magnitude relationship in any of the above scenarios is established, it can be determined that the bandwidth occupation rate of the SRv6 TE Policy is greater than the upper threshold value, i.e., the primary candidate path included in the SRv6 TE Policy meets the target quality condition.

In another example, the target IPR template further includes a delay threshold, a packet loss rate threshold, and other parameters. Accordingly, in process A, for each SRv6 TE Policy, it is necessary to determine whether the bandwidth occupation rate of the SRv6 TE Policy is less than the upper threshold value, whether the transmission delay is less than the delay threshold, and whether the packet loss rate is less than the packet loss rate threshold. In response to a determination that the bandwidth occupation rate of the SRv6 TE Policy is less than the upper threshold value, the transmission delay is less than the delay threshold, and the packet loss rate is less than the packet loss rate threshold, the SRv6 TE Policy is determined to meet the target quality condition; in response to a determination that the bandwidth occupation rate of the SRv6 TE Policy is not less than the upper threshold value, or the transmission delay is not less than the delay threshold, or the packet loss rate is not less than the packet loss rate threshold, the SRv6 TE Policy is determined to not meet the target quality condition. It is understandable that in response to a determination that the target IPR template further includes other threshold criteria for indicators, it is necessary to determine whether each indicator of the SRv6 TE Policy meets the threshold criteria for the indicator.

By adopting this method, by periodically collecting the path quality parameter of each SRv6 TE Policy, the headend can accurately determine, based on real-time conditions, whether the path quality parameter of each SRv6 TE Policy meets the target quality condition in the target IPR template, thereby accurately selecting SRv6 TE Policies that meet the target quality condition. This ensures optimal path selection for traffic and avoids issues such as network congestion and data loss.

Figure 4:
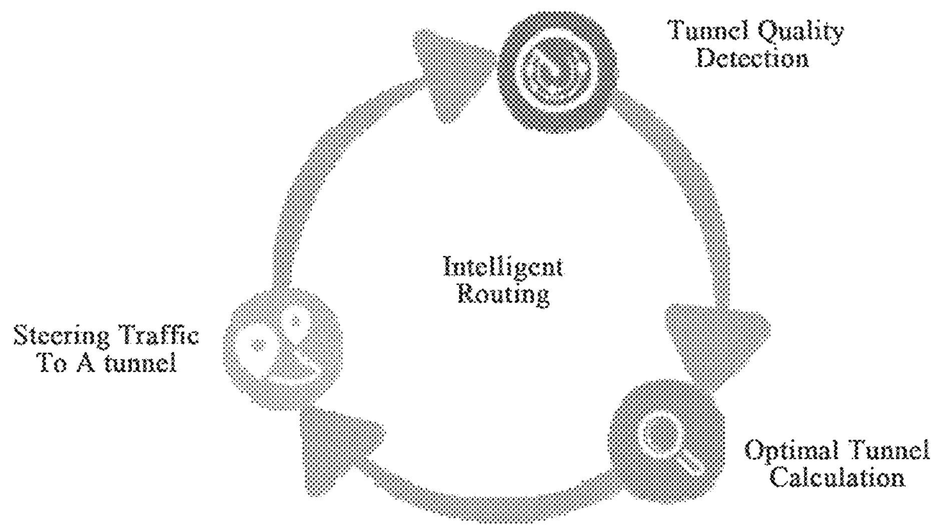
FIG. 4 is a schematic diagram of an overall solution for the method for packet forwarding provided based on an example of the present disclosure.

The following describes processes for packet forwarding provided in the examples of the present disclosure with specific examples. As shown in FIG. 4, the examples of the present disclosure can be implemented through SRv6 TE Policy intelligent routing based on tunnel quality, specifically through the coordination of three functions: tunnel quality detection, optimal tunnel calculation, and steering traffic into a tunnel.

The tunnel quality detection refers to obtaining the path quality parameter of the primary candidate path included in each SRv6 TE Policy in the target IPR template as mentioned in the previous examples.

Optimal tunnel calculation refers to the process of selecting the first candidate path once every preset period as mentioned in the previous examples.

Steering traffic into a tunnel refers to the process of steering service packets into the first candidate path after receiving the service packets.

Figure 5:
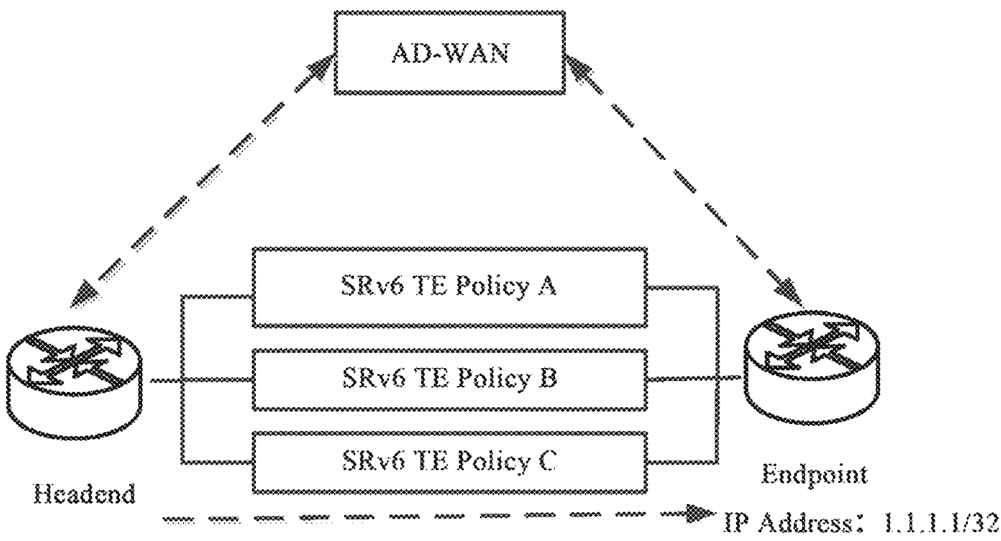
FIG. 5 is an exemplary diagram of an application scenario provided based on an example of the present disclosure.

As shown in FIG. 5, a new-generation Application-driven Wide Area Network (AD-WAN) pre-deploys tunnel policies between a headend and an endpoint, adds a color attribute for VPN routes, further deploys QoS (Quality of Service) policies for services, and establishes a mapping relationship between TE-classes and IPR templates. The specific implementation processes are as follows:

(1) Deploying tunnel policies and using a SRv6 TE Policy group for tunnel-based forwarding of service traffic.

As shown in FIG. 5, the IP address of the endpoint is 1.1.1.1/32, and the tunnel policy deployed in the headend is: a packet having a destination address of 1.1.1.1 is forwarded through SRv6 TE Policy group 100.

There is SRv6 TE Policy group 100 in the headend, and there are three SRv6 TE Policies in one IPR template of the SRv6 TE Policy group 100, namely SRv6 TE Policy A, SRv6 TE Policy B, and SRv6 TE Policy C.

In another implementation, packets can also be steered into SRv6 TE Policy group 100 using a color-based traffic steering method. The example of the present disclosure does not limit the method of steering packets into the SRv6 TE Policy group.

(2) Marking the TE Class ID of key service traffic through QoS policies.

After steering a service packet into SRv6 TE Policy group 100, the TE Class ID corresponding to the service packet can be determined based on the mapping relationship between the flow characteristic of the service packet and the TE Class ID.

For example, the QoS policy in headend A is: marking the TE Class ID of critical service A as 10.

(3) Establishing a mapping relationship between TE Class IDs and IPR templates.

After determining the TE Class ID corresponding to the service packet, the target IPR template corresponding to the TE Class ID of the current service packet can be determined based on the mapping relationship between TE Class IDs and IPR templates. Thus, the service packet is forwarded based on the primary candidate path included in the current optimal SRv6 TE Policy in the target IPR template. For example, in response to a determination that SRv6 TE Policy A, SRv6 TE Policy B, and SRv6 TE Policy C all meet the target quality condition and SRv6 TE Policy A has the highest link priority, the service packet is forwarded using the primary candidate path of SRv6 TE Policy A.

By adopting this method, paths that meet the target quality condition can be dynamically and intelligently selected for service traffic without manual adjustment by operation and maintenance staff. This allows for balanced use of the bandwidths of SRv6 TE Policies, avoiding a situation where the bandwidth occupation rate of some SRv6 TE Policies is too high or even congested, thereby improving service quality.

Figure 6:
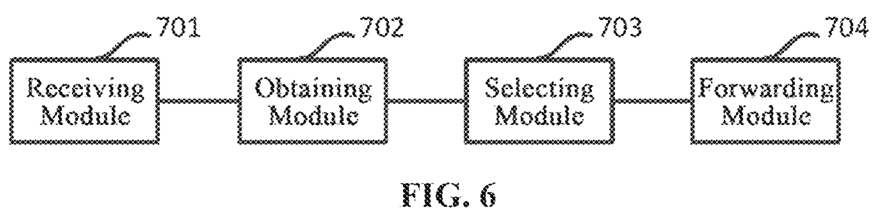
FIG. 6 is a structural diagram of an apparatus for packet forwarding provided based on an example of the present disclosure.

Corresponding to the above method example, an example of the present disclosure also provides an apparatus for packet forwarding, as shown in FIG. 6, including:

- a receiving module 701 for receiving a service packet having a destination address and a flow characteristic;
- an obtaining module 702 for obtaining a target service attribute matching the flow characteristic, and obtaining at least one Intelligent Policy Routing (IPR) template matching the destination address;
- a selecting module 703 for selecting a target IPR template matching the target service attribute from the at least one IPR template, and obtaining a target quality condition of the target IPR template; and for selecting a SRv6 TE Policy meeting the target quality condition from the target IPR template, wherein the SRv6 TE Policy includes a first candidate path;
- a forwarding module 704 for forwarding the service packet through the first candidate path;
- wherein each IPR template includes multiple SRv6 TE Policies with a same service attribute and a quality condition corresponding to the service attribute, wherein the multiple SRv6 TE Policies have different link priorities, and the selected SRv6 TE Policy has a highest link priority.

Optionally, the target IPR template further includes a preset period; the apparatus further includes a path selection module;

- the path selection module is specifically for performing following operations every preset period:
- acquiring a path quality parameter of a primary candidate path included in each SRv6 TE Policy in the target IPR template;
- determining whether the path quality parameter of the primary candidate path included in each SRv6 TE Policy in the target IPR template meets the target quality condition;
- adding the primary candidate path included in the SRv6 TE Policy of which the path quality parameter meets the target quality condition, to a candidate path set;
- selecting a second candidate path with a highest link priority from the candidate path set;
- setting the second candidate path selected within a preset duration as the first candidate path in response to a determination that the second candidate path is different from a currently used candidate path.

Optionally, the target IPR template further includes a preset period; the apparatus further includes a path selection module;

- the path selection module is specifically for performing following operations every preset period:
- obtaining a path quality parameter of a primary candidate path included in each SRv6 TE Policy in the target IPR template;
- determining whether the path quality parameter of the primary candidate path included in each SRv6 TE Policy in the target IPR template meets the target quality condition in a sequence of link priorities from high to low;
- setting a primary candidate path which is the first one that meets the target quality condition, as a third candidate path;
- setting the third candidate path selected within a preset duration as the first candidate path in response to a determination that the third candidate path is different from a currently used candidate path.

Optionally, the preset duration is a preset duration included in the target IPR template and matching the target service attribute.

Optionally, at least two SRv6 TE Policies in the target IPR template share a first outgoing interface, the currently used candidate path includes primary candidate paths of the at least two SRv6 TE Policies, and a fourth candidate path among the primary candidate paths of the at least two SRv6 TE Policies has a lowest scheduling priority;

- the path selection module is specifically for setting the second candidate path selected within the preset duration as the first candidate path for replacing the fourth candidate path in response to a determination that the second candidate path is different from the fourth candidate path.

Optionally, at least two SRv6 TE Policies in the target IPR template share a first outgoing interface, the currently used candidate path includes primary candidate paths of the at least two SRv6 TE Policies, and a fourth candidate path among the primary candidate paths of the at least two SRv6 TE Policies has a lowest scheduling priority;

- the path selection module is specifically for setting the third candidate path selected within the preset duration as the first candidate path for replacing the fourth candidate path in response to a determination that the third candidate path is different from the fourth candidate path.

Optionally, the path selection module is specifically for obtaining a used bandwidth and a total bandwidth of an outgoing interface corresponding to the primary candidate path of each SRv6 TE Policy in the target IPR template; obtaining a real-time quality parameter and an expected quality parameter of the primary candidate path of each SRv6 TE Policy in the target IPR template;

- the path selection module is specifically for: for each SRv6 TE Policy in the target IPR template,
- determining whether the used bandwidth and total bandwidth of the outgoing interface corresponding to the SRv6 TE Policy, and the real-time quality parameter or the expected quality parameter of the primary candidate path of the SRv6 TE Policy, meet the target quality condition;
- determine that the path quality parameter of the SRv6 TE Policy meets the target quality condition in response to a determination that the used bandwidth and the total bandwidth of the outgoing interface corresponding to the SRv6 TE policy, and the real-time quality parameter or the expected quality parameter of the primary candidate path of the SRv6 TE policy, meet the target quality condition;
- determining that the path quality parameter of the SRv6 TE Policy does not meet the target quality condition in response to a determination that the used bandwidth and the total bandwidth of the outgoing interface corresponding to the SRv6 TE policy, and the real-time quality parameter or the expected quality parameter of the primary candidate path of the SRv6 TE policy, do not meet the target quality condition.

Optionally, the target quality condition includes an upper threshold value for bandwidth occupation rate, the real-time quality parameter includes at least a real-time bandwidth, and the expected quality parameter includes at least an expected bandwidth;

the path selection module is specifically for:

in response to a determination that no traffic is forwarded based on the SRv6 TE Policy currently, determining an expected occupied bandwidth of traffic of the target service attribute based on the real-time bandwidth or the expected bandwidth of the primary candidate path of the SRv6 TE Policy;

determining a sum of the used bandwidth of the outgoing interface corresponding to the SRv6 TE policy and the expected occupied bandwidth;

setting a product of the total bandwidth of the outgoing interface corresponding to the SRv6 TE Policy and the upper threshold value as an upper limit of bandwidth occupation;

determining whether the sum is less than the upper limit of bandwidth occupation;

determining that the target quality condition is met in response to a determination that the sum is less than the upper limit of bandwidth occupation;

determining that the target quality condition is not met in response to a determination that the sum is not less than the upper limit of bandwidth occupation.

Optionally, the target quality condition includes an upper threshold value for bandwidth occupation rate, the real-time quality parameter includes a real-time bandwidth, and the expected quality parameter includes an expected bandwidth;

the path selection module is specifically for:

in response to a determination that traffic has been forwarded based on the SRv6 TE Policy currently, setting a product of the total bandwidth of the outgoing interface corresponding to the SRv6 TE Policy and the upper threshold value as an upper limit of bandwidth occupation;

determining whether the used bandwidth of the outgoing interface corresponding to the SRv6 TE Policy is less than the upper limit of bandwidth occupation;

determining that the target quality condition is met in response to a determination that the used bandwidth of the outgoing interface corresponding to the SRv6 TE policy is less than the upper limit of bandwidth occupation;

determining that the target quality condition is not met in response to a determination that the used bandwidth of the outgoing interface corresponding to the SRv6 TE policy is not less than the upper limit of bandwidth occupation.

Optionally, the path selection module is specifically for setting the expected bandwidth of the primary candidate path of the SRv6 TE Policy as the expected occupied bandwidth in response to a determination that the traffic of the target service attribute has not been forwarded based on the primary candidate path of the SRv6 TE Policy;

setting an average value of real-time bandwidths of the primary candidate path of the SRv6 TE Policy obtained within a preset number of preset periods as the expected occupied bandwidth in response to a determination that the traffic of the target service attribute has been forwarded based on the primary candidate path of the SRv6 TE Policy.

Optionally, the at least one IPR template belongs to a same SRv6 TE Policy group, and the SRv6 TE Policy group matches the destination address.

Figure 7:
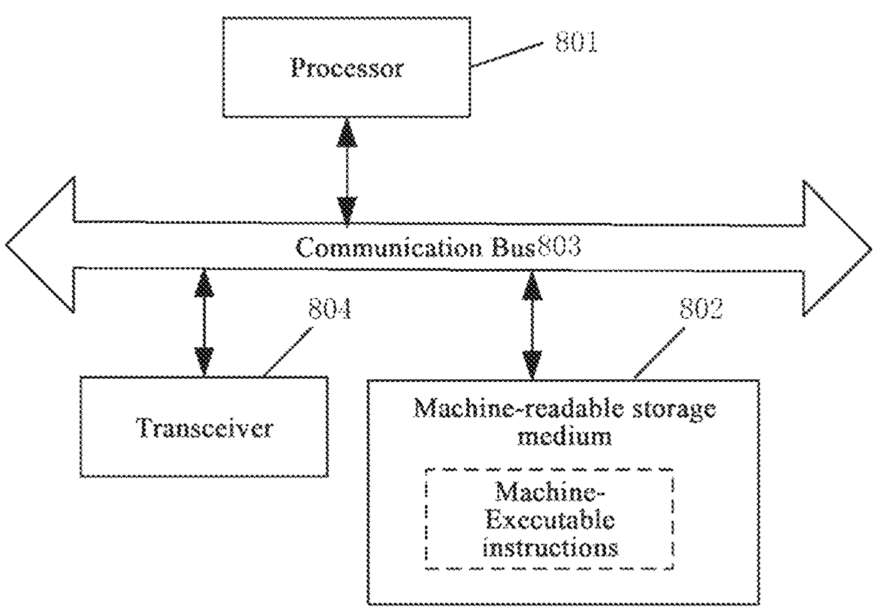
FIG. 7 is a structural diagram of an electronic device provided based on an example of the present disclosure

Corresponding to the above-mentioned method example, an example of the present disclosure also provides an electronic device. As shown in FIG. 7, the electronic device includes:

a processor 801;

a transceiver 804;

a machine-readable storage medium 802 storing machine-executable instructions that can be executed by the processor 801; the machine-executable instructions cause the processor 801 to execute following processes:

receiving a service packet having a destination address and a flow characteristic;

obtaining a target service attribute matching the flow characteristic, and obtaining at least one Intelligent Policy Routing (IPR) template matching the destination address;

selecting a target IPR template matching the target service attribute from the at least one IPR template, and obtaining a target quality condition of the target IPR template;

selecting a SRv6 TE Policy meeting the target quality condition from the target IPR template, wherein the SRv6 TE Policy includes a first candidate path;

forwarding the service packet through the first candidate path;

wherein each IPR template includes multiple SRv6 TE Policies with a same service attribute and a quality condition corresponding to the service attribute, wherein the multiple SRv6 TE Policies have different link priorities, and the selected SRv6 TE Policy has a highest link priority.

Optionally, the target IPR template further includes a preset period; the machine-executable instructions further cause the processor 801 to execute following processes:

performing following operations every preset period:

obtaining a path quality parameter of a primary candidate path included in each SRv6 TE Policy in the target IPR template;

determining whether the path quality parameter of the primary candidate path included in each SRv6 TE Policy in the target IPR template meets the target quality condition;

adding the primary candidate path included in the SRv6 TE Policy of which the path quality parameter meets the target quality condition, to a candidate path set;

selecting a second candidate path with a highest link priority from the candidate path set;

setting the second candidate path selected within a preset duration as the first candidate path in response to a determination that the second candidate path is different from a currently used candidate path.

Optionally, the target IPR template further includes a preset period; the machine-executable instructions further cause the processor 801 to execute following processes:

performing following operations every preset period:

obtaining a path quality parameter of a primary candidate path included in each SRv6 TE Policy in the target IPR template;

determining whether the path quality parameter of the primary candidate path included in each SRv6 TE Policy in the target IPR template meets the target quality condition in a sequence of link priorities from high to low;

setting a primary candidate path which is the first one that meets the target quality condition, as a third candidate path;

setting the third candidate path selected within a preset duration as the first candidate path in response to a determination that the third candidate path is different from a currently used candidate path.

Optionally, the preset duration is a preset duration included in the target IPR template and matching the target service attribute.

Optionally, at least two SRv6 TE Policies in the target IPR template share a first outgoing interface, the currently used candidate path includes primary candidate paths of the at least two SRv6 TE Policies, and a fourth candidate path among the primary candidate paths of the at least two SRv6 TE Policies has a lowest scheduling priority;

the machine-executable instructions further cause the processor 801 to execute following processes:

setting the second candidate path selected within the preset duration as the first candidate path for replacing the fourth candidate path in response to a determination that the second candidate path is different from the fourth candidate path.

Optionally, at least two SRv6 TE Policies in the target IPR template share a first outgoing interface, the currently used candidate path includes primary candidate paths of the at least two SRv6 TE Policies, and a fourth candidate path among the primary candidate paths of the at least two SRv6 TE Policies has a lowest scheduling priority;

the machine-executable instructions further cause the processor 801 to execute following processes:

setting the third candidate path selected within the preset duration as the first candidate path for replacing the fourth candidate path in response to a determination that the third candidate path is different from the fourth candidate path.

Optionally, the machine-executable instructions further cause the processor 801 to execute the following processes:

obtaining a used bandwidth and a total bandwidth of an outgoing interface corresponding to the primary candidate path of each SRv6 TE Policy in the target IPR template;

obtaining a real-time quality parameter and an expected quality parameter of the primary candidate path of each SRv6 TE Policy in the target IPR template;

determining whether the path quality parameter of the primary candidate path included in each SRv6 TE Policy in the target IPR template meets the target quality condition, includes: for each SRv6 TE Policy in the target IPR template, determining whether the used bandwidth and the total bandwidth of the outgoing interface corresponding to the SRv6 TE Policy, as well as the real-time quality parameter or the expected quality parameter of the primary candidate path of the SRv6 TE Policy, meet the target quality condition;

determining that the path quality parameter of the SRv6 TE Policy meets the target quality condition in response to a determination that the used bandwidth and the total bandwidth of the outgoing interface corresponding to the SRv6 TE Policy, as well as the real-time quality parameter or the expected quality parameter of the primary candidate path of the SRv6 TE Policy, meet the target quality condition;

determining that the path quality parameter of the SRv6 TE Policy does not meet the target quality condition in response to a determination that the used bandwidth and the total bandwidth of the outgoing interface corresponding to the SRv6 TE Policy, as well as the real-time quality parameter or the expected quality parameter of the primary candidate path of the SRv6 TE Policy, do not meet the target quality condition.

Optionally, the target quality condition includes an upper threshold value for bandwidth occupation rate, the real-time quality parameter includes a real-time bandwidth, and the expected quality parameter includes an expected bandwidth;

the machine-executable instructions further cause the processor 801 to execute following processes:

in response to a determination that no traffic is forwarded based on the SRv6 TE Policy currently, determining an expected occupied bandwidth of traffic of the target service attribute based on the real-time bandwidth or the expected bandwidth of the primary candidate path of the SRv6 TE Policy;

determining a sum of the used bandwidth of the outgoing interface corresponding to the SRv6 TE Policy and the expected occupied bandwidth;

setting a product of the total bandwidth of the outgoing interface corresponding to the SRv6 TE Policy and the upper threshold value as an upper limit of bandwidth occupation;

determining whether the sum is less than the upper limit of bandwidth occupation;

determining that the target quality condition is met in response to a determination that the sum is less than the upper limit of bandwidth occupation;

determining that the target quality condition is not met in response to a determination that the sum is not less than the upper limit of bandwidth occupation.

Optionally, the target quality condition includes an upper threshold value for bandwidth occupation rate, the real-time quality parameter includes a real-time bandwidth, and the expected quality parameter includes an expected bandwidth;

the machine-executable instructions further cause the processor 801 to execute following processes:

in response to a determination that traffic has been forwarded based on the SRv6 TE Policy currently, setting a product of the total bandwidth of the outgoing interface corresponding to the SRv6 TE Policy and the upper threshold value as an upper limit of bandwidth occupation;

determining whether the used bandwidth of the outgoing interface corresponding to the SRv6 TE Policy is less than the upper limit of bandwidth occupation;

determining that the target quality condition is met in response to a determination that the used bandwidth of the outgoing interface corresponding to the SRv6 TE policy is less than the upper limit of bandwidth occupation;

determining that the target quality condition is not met in response to a determination that the used bandwidth of the outgoing interface corresponding to the SRv6 TE policy is not less than the upper limit of bandwidth occupation.

Optionally, the machine-executable instructions further cause the processor 801 to execute following processes:

setting the expected bandwidth of the primary candidate path of the SRv6 TE Policy as the expected occupied bandwidth in response to a determination that the traffic of the target service attribute has not been forwarded based on the primary candidate path of the SRv6 TE Policy;

setting an average value of real-time bandwidths of the primary candidate path of the SRv6 TE Policy obtained within a preset number of preset periods as the expected occupied bandwidth in response to a determination that the traffic of the target service attribute has been forwarded based on the primary candidate path of the SRv6 TE Policy.

Optionally, the at least one IPR template belongs to a same SRv6 TE Policy group, and the SRv6 TE Policy group matches the destination address.

As shown in FIG. 7, the electronic device may further include a communication bus 803. The processor 801, the machine-readable storage medium 802, and the transceiver 804 communicate with each other through the communication bus 803. The communication bus 803 may be a Peripheral Component Interconnect (PCI) bus, an Extended Industry Standard Architecture (EISA) bus, or the like. The communication bus 803 can be divided into an address bus, a data bus, a control bus, and the like.

The transceiver 804 may be a wireless communication module. Under the control of the processor 801, the transceiver 804 interacts with other apparatuses.

The machine-readable storage medium 802 may include Random Access Memory (RAM) or include Non-Volatile Memory (NVM), such as at least one magnetic disk storage. In addition, the machine-readable storage medium 802 may also be at least one storage device located away from the aforementioned processor.

The processor 801 may be a general-purpose processor, including a Central Processing Unit (CPU), a Network Processor (NP), and the like; it may also be a Digital Signal Processing (DSP), an Application Specific Integrated Circuit (ASIC), a Field-Programmable Gate Array (FPGA) or other programmable logic devices, discrete gate or transistor logic devices, discrete hardware components.

In another example provided by the present disclosure, a computer-readable storage medium is also provided, which stores a computer program, wherein the computer program, when executed by a processor, carries out the processes of any of the above-mentioned methods for packet forwarding.

In another example provided by the present disclosure, a computer program product containing instructions is also provided, wherein the instructions, when run on a computer, cause the computer to carry out any of the methods for packet forwarding in the above-mentioned examples.

In the above-mentioned examples, it may be implemented wholly or partially through software, hardware, firmware, or any combination thereof. When implemented using software, it may be implemented wholly or partially in the form of a computer program product. The computer program product includes one or more computer instructions. When the computer program instructions are loaded and executed on a computer, the processes or functions described in the examples of the present disclosure are produced wholly or partially. The computer may be a general-purpose computer, a dedicated computer, a computer network, or other programmable devices. The computer instructions may be stored in a computer-readable storage medium or transmitted from one computer-readable storage medium to another. For example, the computer instructions may be transmitted from one website, computer, server, or data center to another website, computer, server, or data center via wired (such as coaxial cable, fiber optics, Digital Subscriber Line (DSL)) or wireless (such as infrared, radio, microwave, etc.) methods. The computer-readable storage medium may be any available medium accessible by a computer or a data storage device integrated with one or more available media, such as a server or data center. The available medium may be a magnetic medium (such as a floppy disk, hard disk, magnetic tape), an optical medium (such as a DVD), or a semiconductor medium (such as a Solid State Disk (SSD)), etc.

It should be noted that in this document, relational terms such as first and second are merely used to distinguish one entity or operation from another entity or operation, and do not necessarily require or imply any such actual relationship or order between these entities or operations. Moreover, the terms "include," "contain," or any other variants are intended to cover non-exclusive inclusions, such that a process, method, article, or device that includes a series of elements not only includes those elements but also includes other elements not explicitly listed or also includes elements that are inherent to such a process, method, article, or device. In the absence of more restrictions, elements defined by the statement "including a . . . " do not exclude the presence of additional identical elements in the process, method, article, or device that includes the elements.

The various examples in the present disclosure are described in a related manner. The same or similar parts between the different examples can refer to each other, and each example focuses on explaining the differences from other examples. In particular, for apparatus examples, which are basically similar to method examples, the description is relatively simple, and relevant sections can refer to the partial description of the method examples.

The above description is only the preferred examples of the present disclosure and is not used to limit the protection scope of the present disclosure. Any modifications, equivalent substitutions, improvements, etc., made within the spirit and principles of the present disclosure, are included within the protection scope of the present disclosure.

What is claimed is:

1. A method for packet forwarding, comprising:

receiving a service packet having a destination address and a flow characteristic;

obtaining a target service attribute matching the flow characteristic, and obtaining at least one intelligent policy routing IPR template matching the destination address;

selecting a target IPR template matching the target service attribute from the at least one IPR template, and obtaining a target quality condition of the target IPR template;

selecting a Segment Routing IPv6 (SRv6) Traffic Engineering (TE) Policy meeting the target quality condition from the target IPR template, wherein the SRv6 TE policy comprises a first candidate path;

forwarding the service packet through the first candidate path;

wherein each IPR template comprises multiple SRv6 TE policies with a same service attribute and a quality condition corresponding to the service attribute, wherein the multiple SRv6 TE policies have different link priorities, and the selected SRv6 TE policy has a highest link priority.

2. The method of claim 1, wherein the target IPR template further comprises a preset period; the method further comprises:

performing following operations every preset period:

obtaining a path quality parameter of a primary candidate path comprised in each SRv6 TE policy in the target IPR template;

determining whether the path quality parameter of the primary candidate path comprised in each SRv6 TE policy in the target IPR template meets the target quality condition;

adding the primary candidate path comprised in the SRv6 TE policy of which the path quality parameter meets the target quality condition, to a candidate path set;

selecting a second candidate path with a highest link priority from the candidate path set;

setting the second candidate path selected within a preset duration as the first candidate path in response to a determination that the second candidate path is different from a currently used candidate path.

3. The method of claim 1, wherein the target IPR template further comprises a preset period; the method further comprises:

performing following operations every preset period:

obtaining a path quality parameter of a primary candidate path comprised in each SRv6 TE policy in the target IPR template;

determining whether the path quality parameter of the primary candidate path comprised in each SRv6 TE policy in the target IPR template meets the target quality condition in a sequence of link priorities from high to low;

setting a primary candidate path which is firstly selected among primary candidate paths comprised in SRv6 TE policies in the target IPR template in the sequence of link priorities from high to low and meets the target quality condition, as a third candidate path;

setting the third candidate path selected within a preset duration as the first candidate path in response to a determination that the third candidate path is different from a currently used candidate path.

4. The method of claim 2, wherein at least two SRv6 TE Policies in the target IPR template share a first outgoing interface, the currently used candidate path comprises primary candidate paths of the at least two SRv6 TE Policies, and a fourth candidate path among the primary candidate paths of the at least two SRv6 TE Policies has a lowest scheduling priority;

wherein, setting the second candidate path selected within the preset duration as the first candidate path in response to a determination that the second candidate path is different from the currently used candidate path comprises:

setting the second candidate path selected within the preset duration as the first candidate path for replacing the fourth candidate path in response to a determination that the second candidate path is different from the fourth candidate path.

5. The method of claim 3, wherein at least two SRv6 TE Policies in the target IPR template share a first outgoing interface, the currently used candidate path comprises primary candidate paths of the at least two SRv6 TE Policies, and a fourth candidate path among the primary candidate paths of the at least two SRv6 TE Policies has a lowest scheduling priority;

wherein, setting the third candidate path selected within the preset duration as the first candidate path in response to a determination that the third candidate path is different from the currently used candidate path comprises:

setting the third candidate path selected within the preset duration as the first candidate path for replacing the fourth candidate path in response to a determination that the third candidate path is different from the fourth candidate path.

6. The method of claim 2, wherein obtaining the path quality parameter of the primary candidate path comprised in each SRv6 TE policy in the target IPR template comprises:

obtaining a used bandwidth and a total bandwidth of an outgoing interface corresponding to the primary candidate path of each SRv6 TE policy in the target IPR template;

obtaining a real-time quality parameter and an expected quality parameter of the primary candidate path of each SRv6 TE policy in the target IPR template;

wherein, determining whether the path quality parameter of the primary candidate path comprised in each SRv6 TE policy in the target IPR template meets the target quality condition comprises: for each SRv6 TE policy in the target IPR template, determining whether the target quality condition is met by the used bandwidth and the total bandwidth of the outgoing interface corresponding to the SRv6 TE policy, and the real-time quality parameter or the expected quality parameter of the primary candidate path of the SRv6 TE policy;

determining that the path quality parameter of the SRv6 TE policy meets the target quality condition in response to a determination that the target quality condition is met by the used bandwidth and the total bandwidth of the outgoing interface corresponding to the SRv6 TE policy, and the real-time quality parameter or the expected quality parameter of the primary candidate path of the SRv6 TE policy;

determining that the path quality parameter of the SRv6 TE policy does not meet the target quality condition in response to a determination that the target quality condition is not met by the used bandwidth and the total bandwidth of the outgoing interface corresponding to the SRv6 TE policy, and the real-time quality parameter or the expected quality parameter of the primary candidate path of the SRv6 TE policy.

7. The method of claim 6, wherein the target quality condition comprises an upper threshold value for bandwidth occupation rate, the real-time quality parameter comprises a real-time bandwidth, and the expected quality parameter comprises an expected bandwidth;

wherein for each SRv6 TE policy in the target IPR template, determining whether the target quality condition is met by the used bandwidth and the total bandwidth of the outgoing interface corresponding to the SRv6 TE policy, and the real-time quality parameter or the expected quality parameter of the primary candidate path of the SRv6 TE policy comprises:

in response to a determination that no traffic is forwarded based on the SRv6 TE policy currently, determining an expected occupied bandwidth for traffic of the target service attribute based on the real-time bandwidth or the expected bandwidth of the primary candidate path of the SRv6 TE policy;

determining a sum of the used bandwidth of the outgoing interface corresponding to the SRv6 TE policy and the expected occupied bandwidth;

setting a product of the total bandwidth of the outgoing interface corresponding to the SRv6 TE policy and the upper threshold value as an upper limit of bandwidth occupation;

determining that the target quality condition is met in response to a determination that the sum is less than the upper limit of bandwidth occupation;

determining that the target quality condition is not met in response to a determination that the sum is not less than the upper limit of bandwidth occupation.

8. The method of claim 6, wherein the target quality condition comprises an upper threshold value for bandwidth occupation rate, the real-time quality parameter comprises a real-time bandwidth, and the expected quality parameter comprises an expected bandwidth;

wherein for each SRv6 TE policy in the target IPR template, determining whether the target quality condition is met by the used bandwidth and the total bandwidth of the outgoing interface corresponding to the SRv6 TE policy, and the real-time quality parameter or the expected quality parameter of the primary candidate path of the SRv6 TE policy comprises:

in response to a determination that traffic has been forwarded based on the SRv6 TE policy currently, setting a product of the total bandwidth of the outgoing interface corresponding to the SRv6 TE policy and the upper threshold value as an upper limit of bandwidth occupation;

determining that the target quality condition is met in response to a determination that the used bandwidth of the outgoing interface corresponding to the SRv6 TE policy is less than the upper limit of bandwidth occupation;

determining that the target quality condition is not met in response to a determination that the used bandwidth of the outgoing interface corresponding to the SRv6 TE policy is not less than the upper limit of bandwidth occupation.

9. The method of claim 7, wherein the determining the expected occupied bandwidth for the traffic of the target service attribute based on the real-time bandwidth or the expected bandwidth of the primary candidate path of the SRv6 TE Policy comprises:

setting the expected bandwidth of the primary candidate path of the SRv6 TE Policy as the expected occupied bandwidth in response to a determination that the traffic of the target service attribute has not been forwarded based on the primary candidate path of the SRv6 TE Policy;

setting an average value of real-time bandwidths of the primary candidate path of the SRv6 TE Policy obtained within a preset number of preset periods as the expected occupied bandwidth in response to a determination that the traffic of the target service attribute has been forwarded based on the primary candidate path of the SRv6 TE Policy.

10. The method of claim 3, wherein obtaining the path quality parameter of the primary candidate path comprised in each SRv6 TE policy in the target IPR template comprises:

obtaining a used bandwidth and a total bandwidth of an outgoing interface corresponding to the primary candidate path of each SRv6 TE policy in the target IPR template;

obtaining a real-time quality parameter and an expected quality parameter of the primary candidate path of each SRv6 TE policy in the target IPR template;

wherein, determining whether the path quality parameter of the primary candidate path comprised in each SRv6 TE policy in the target IPR template meets the target quality condition comprises: for each SRv6 TE policy in the target IPR template, determining whether the target quality condition is met by the used bandwidth and the total bandwidth of the outgoing interface corresponding to the SRv6 TE policy, and the real-time quality parameter or the expected quality parameter of the primary candidate path of the SRv6 TE policy;

determining that the path quality parameter of the SRv6 TE policy meets the target quality condition in response to a determination that the target quality condition is met by the used bandwidth and the total bandwidth of the outgoing interface corresponding to the SRv6 TE policy, and the real-time quality parameter or the expected quality parameter of the primary candidate path of the SRv6 TE policy;

determining that the path quality parameter of the SRv6 TE policy does not meet the target quality condition in response to a determination that the target quality condition is not met by the used bandwidth and the total bandwidth of the outgoing interface corresponding to the SRv6 TE policy, and the real-time quality parameter or the expected quality parameter of the primary candidate path of the SRv6 TE policy.

11. An electronic device, wherein the comprising:

a processor;

a transceiver;

a machine-readable storage medium storing machine-executable instructions that can be executed by the processor; the machine-executable instructions cause the processor to execute following processes:

receiving a service packet having a destination address and a flow characteristic;

obtaining a target service attribute matching the flow characteristic, and obtaining at least one Intelligent Policy Routing IPR template matching the destination address;

selecting a target IPR template matching the target service attribute from the at least one IPR template, and obtaining a target quality condition of the target IPR template;

selecting a Segment Routing IPv6 (SRv6) Traffic Engineering (TE) Policy meeting the target quality condition from the target IPR template, wherein the SRv6 TE Policy comprises a first candidate path;

forwarding the service packet through the first candidate path;

wherein each IPR template comprises multiple SRv6 TE Policies with a same service attribute and a quality condition corresponding to the service attribute, wherein the multiple SRv6 TE Policies have different link priorities, and the selected SRv6 TE Policy has a highest link priority.

12. The electronic device of claim 11, wherein the target IPR template further comprises a preset period; the machine-executable instructions further cause the processor to execute following processes:

performing following operations every preset period:

obtaining a path quality parameter of a primary candidate path comprised in each SRv6 TE Policy in the target IPR template;

determining whether the path quality parameter of the primary candidate path comprised in each SRv6 TE Policy in the target IPR template meets the target quality condition;

adding the primary candidate path comprised in the SRv6 TE Policy of which the path quality parameter meets the target quality condition, to a candidate path set;

selecting a second candidate path with a highest link priority from the candidate path set;

setting the second candidate path selected within a preset duration as the first candidate path in response to a determination that the second candidate path is different from a currently used candidate path.

13. The electronic device of claim 11, wherein the target IPR template further comprises a preset period; the machine-executable instructions further cause the processor to execute following processes:

performing following operations every preset period:

obtaining a path quality parameter of a primary candidate path comprised in each SRv6 TE Policy in the target IPR template;

determining whether the path quality parameter of the primary candidate path comprised in each SRv6 TE Policy in the target IPR template meets the target quality condition in a sequence of link priorities from high to low;

setting a primary candidate path which is firstly selected among primary candidate paths comprised in SRv6 TE policies in the target IPR template in the sequence of link priorities from high to low and meets the target quality condition, as a third candidate path;

setting the third candidate path selected within a preset duration as the first candidate path in response to a determination that the third candidate path is different from a currently used candidate path.

14. The electronic device of claim 12, wherein at least two SRv6 TE Policies in the target IPR template share a first outgoing interface, the currently used candidate path comprises primary candidate paths of the at least two SRv6 TE Policies, and a fourth candidate path among the primary candidate paths of the at least two SRv6 TE Policies has a lowest scheduling priority;

the machine-executable instructions further cause the processor to execute following processes:

setting the second candidate path selected within the preset duration as the first candidate path for replacing the fourth candidate path in response to a determination that the second candidate path is different from the fourth candidate path.

15. The electronic device of claim 13, wherein at least two SRv6 TE Policies in the target IPR template share a first outgoing interface, the currently used candidate path comprises primary candidate paths of the at least two SRv6 TE Policies, and a fourth candidate path among the primary candidate paths of the at least two SRv6 TE Policies has a lowest scheduling priority;

the machine-executable instructions further cause the processor to execute following processes:

setting the third candidate path selected within the preset duration as the first candidate path for replacing the fourth candidate path in response to a determination that the third candidate path is different from the fourth candidate path.

16. The electronic device of claim 12, wherein the machine-executable instructions further cause the processor to execute following processes:

obtaining a used bandwidth and a total bandwidth of an outgoing interface corresponding to the primary candidate path of each SRv6 TE Policy in the target IPR template;

obtaining a real-time quality parameter and an expected quality parameter of the primary candidate path of each SRv6 TE Policy in the target IPR template;

wherein, determining whether the path quality parameter of the primary candidate path comprised in each SRv6 TE Policy in the target IPR template meets the target quality condition comprises: for each SRv6 TE Policy in the target IPR template, determining whether the target quality condition is met by the used bandwidth and the total bandwidth of the outgoing interface corresponding to the SRv6 TE Policy, and the real-time quality parameter or the expected quality parameter of the primary candidate path of the SRv6 TE Policy;

determining that the path quality parameter of the SRv6 TE Policy meets the target quality condition in response to a determination that the target quality condition is met by the used bandwidth and the total bandwidth of the outgoing interface corresponding to the SRv6 TE policy, and the real-time quality parameter or the expected quality parameter of the primary candidate path of the SRv6 TE policy;

determining that the path quality parameter of the SRv6 TE Policy does not meet the target quality condition in response to a determination that the target quality condition is not met by the used bandwidth and the total bandwidth of the outgoing interface corresponding to the SRv6 TE policy, and the real-time quality parameter or the expected quality parameter of the primary candidate path of the SRv6 TE policy.

17. The electronic device of claim 16, wherein the target quality condition comprises an upper threshold value for bandwidth occupation rate, the real-time quality parameter comprises a real-time bandwidth, and the expected quality parameter comprises an expected bandwidth;

wherein the machine-executable instructions further cause the processor to execute following processes:

in response to a determination that no traffic is forwarded based on the SRv6 TE Policy currently, determining an expected occupied bandwidth for traffic of the target service attribute based on the real-time bandwidth or the expected bandwidth of the primary candidate path of the SRv6 TE Policy;

determining a sum of the used bandwidth of the outgoing interface corresponding to the SRv6 TE Policy and the expected occupied bandwidth;

setting a product of the total bandwidth of the outgoing interface corresponding to the SRv6 TE Policy and the upper threshold value as an upper limit of bandwidth occupation;

determining that the target quality condition is met in response to a determination that the sum is less than the upper limit of bandwidth occupation;

determining that the target quality condition is not met in response to a determination that the sum is not less than the upper limit of bandwidth occupation.

18. The electronic device of claim 16, wherein the target quality condition comprises an upper threshold value for bandwidth occupation rate, the real-time quality parameter comprises a real-time bandwidth, and the expected quality parameter comprises an expected bandwidth;

wherein the machine-executable instructions further cause the processor to execute following processes:

in response to a determination that traffic has been forwarded based on the SRv6 TE Policy currently, setting a product of the total bandwidth of the outgoing interface corresponding to the SRv6 TE Policy and the upper threshold value as an upper limit of bandwidth occupation;

determining that the target quality condition is met in response to a determination that the used bandwidth of the outgoing interface corresponding to the SRv6 TE policy is less than the upper limit of bandwidth occupation;

determining that the target quality condition is not met in response to a determination that the used bandwidth of the outgoing interface corresponding to the SRv6 TE policy is not less than the upper limit of bandwidth occupation.

19. The electronic device of claim 17, wherein the machine-executable instructions further cause the processor to execute following processes:

setting the expected bandwidth of the primary candidate path of the SRv6 TE Policy as the expected occupied bandwidth in response to a determination that the traffic of the target service attribute has not been forwarded based on the primary candidate path of the SRv6 TE Policy;

setting an average value of real-time bandwidths of the primary candidate path of the SRv6 TE Policy obtained within a preset number of preset periods as the expected occupied bandwidth in response to a determination that the traffic of the target service attribute has been forwarded based on the primary candidate path of the SRv6 TE Policy.

20. The electronic device of claim 13, wherein the machine-executable instructions further cause the processor to execute following processes:

obtaining a used bandwidth and a total bandwidth of an outgoing interface corresponding to the primary candidate path of each SRv6 TE Policy in the target IPR template;

obtaining a real-time quality parameter and an expected quality parameter of the primary candidate path of each SRv6 TE Policy in the target IPR template;

wherein, determining whether the path quality parameter of the primary candidate path comprised in each SRv6 TE Policy in the target IPR template meets the target quality condition comprises: for each SRv6 TE Policy in the target IPR template, determining whether the target quality condition is met by the used bandwidth and the total bandwidth of the outgoing interface corresponding to the SRv6 TE Policy, and the real-time quality parameter or the expected quality parameter of the primary candidate path of the SRv6 TE Policy;

determining that the path quality parameter of the SRv6 TE Policy meets the target quality condition in response to a determination that the target quality condition is met by the used bandwidth and the total bandwidth of the outgoing interface corresponding to the SRv6 TE policy, and the real-time quality parameter or the expected quality parameter of the primary candidate path of the SRv6 TE policy;

determining that the path quality parameter of the SRv6 TE Policy does not meet the target quality condition in response to a determination that the target quality condition is not met by the used bandwidth and the total bandwidth of the outgoing interface corresponding to the SRv6 TE policy, and the real-time quality parameter or the expected quality parameter of the primary candidate path of the SRv6 TE policy.

* * * * *